Aug. 7, 1962 S. S. LONGSTRETH 3,048,691
WELDING GUN
Filed March 31, 1960

WITNESSES
John E. Hearley, Jr.
James F. Young

INVENTOR
Scott S. Longstreth
BY
Hymen Diamond
ATTORNEY

United States Patent Office 3,048,691
Patented Aug. 7, 1962

3,048,691
WELDING GUN
Scott S. Longstreth, Pittsburgh, Pa., assignor to Westinghouse Electric Corporation, East Pittsburgh, Pa., a corporation of Pennsylvania
Filed Mar. 31, 1960, Ser. No. 18,904
7 Claims. (Cl. 219—130)

This invention relates to the arc welding art and has particular relationship to guns for arc welding with a consumable electrode.

Guns typical of the prior art are disclosed in Miller Patent 2,806,125 and Bichsel Patent 2,813,193. The Bichsel gun includes a tube 111 (FIGS. 6, 7, 8 and 9) of insulating material in engagement with the extension 25 of the barrel of the gun. This tube 111 prevents particles of metal from producing short circuits between the electrode guide tube 31 and the extension 25. Such short circuits would tend to puncture the inner wall of the extension.

Many of the Miller and Bichsel guns are in operation throughout the United States and in foreign countries, and they give highly satisfactory service. But it has been found particularly in automatic and semiautomatic arc spot welding with such guns that the welds are not positioned with the desired precision and it is an object of this invention to provide an arc welding gun particularly for arc spot welding in the use of which the welds shall be precisely positioned.

It is another object of this invention to provide an arc welding gun for welding with a consumable electrode which shall include means both for precisely positioning the welds and for preventing short circuiting between the barrel of the gun and the electrode guide tube by particles of metal.

This invention arises from the discovery that the improper positioning of the welds with prior art guns is caused by the tendency of the electrode guide tube (GE, FIGS. 6, 8, Miller; 31, FIGS. 6, 7, Bichsel) to become displaced radially from the axis of the nozzle (N, FIGS. 5, 6, Miller; 23, FIGS. 6, 7, Bichsel). In accordance with this invention, the electrode guide tube is centered by an additional tube, which may be called a centering tube, extending at least along a portion of the barrel near the nozzle. This tube is held in the barrel by engagement with the internal surface of the portion of the barrel along which it extends and encases the electrode guide tube. Preferably, the additional tube is coaxial with the nozzle and the electrode guide tube encased in it is maintained coaxial with the nozzle. In the use of the apparatus the welding electrode passing out of the guide tube is then centered with reference to the tip of the nozzle and a precisely positioned weld is produced.

The external surface of the additional tube is grooved so that there are spaces longitudinally between the supporting surface of the barrel and the outer surface of the tube. The shielding gas is transmitted through these spaces.

The additional centering tube may be composed of an electrically insulating material, such as melamine or may have an internal or external lining or coating of electrically insulating material. The centering tube then performs the additional function of preventing short circuiting between the guide tube and the barrel by particles of metal.

The novel features considered characteristic of this invention are disclosed generally above. The invention itself, both as to its organization and as to its method of operation, together with additional objects and advantages thereof, will be understood from the following description of a specific embodiment taken in connection with the accompanying drawing, in which.

Figure 1:
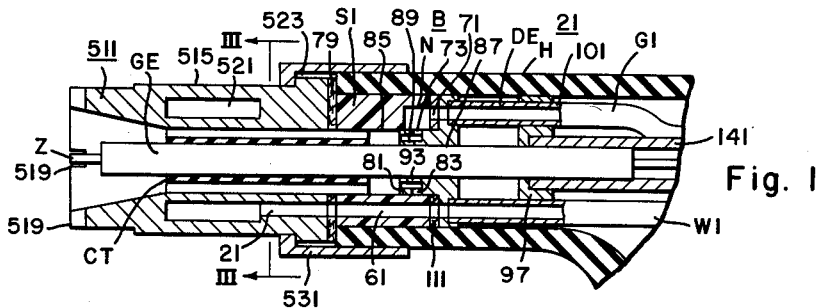
FIGURE 1 is a view in longitudinal section taken along one plane of a gun in accordance with this invention.
Figure 2:
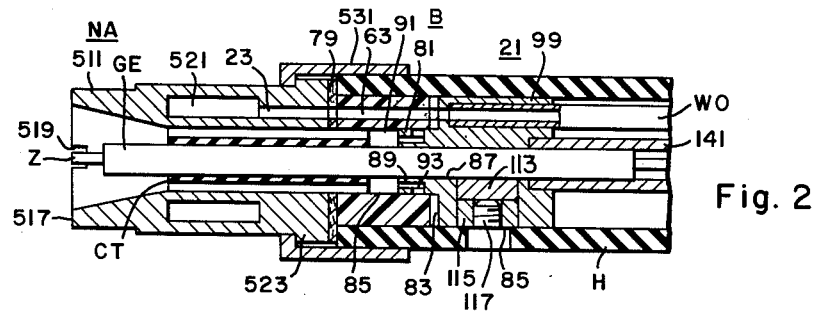
FIG. 2 is a view in longitudinal section taken along another plane of this gun.
Figure 3:
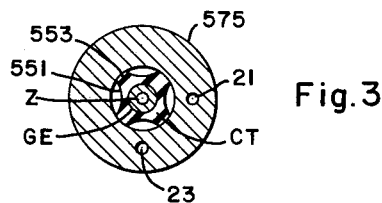
FIG. 3 is a section taken along line III—III of FIG. 1.

This invention may be embodied in guns or torches of different types. For purposes of illustration only, this invention is shown in this application as embodied in a gun such as is disclosed in Miller Patent 2,806,125. This invention involves only the portion of the gun adjacent the nozzle and only this portion of the gun is illustrated in FIGS. 1, 2 and 3. The remainder of the gun is disclosed in the Miller patent and reference is made to this patent. To facilitate the understanding of the invention, the parts of the gun in accordance with this invention which are the same or similar to parts of the Miller gun are similarly labeled.

The gun shown in FIGS. 1, 2 and 3 includes a barrel B having a housing H of insulating material. The barrel B includes a nozzle assembly NA, an insulating spacer SI, a header DE, an electrode guide tube GE, and the centering tube CT and the other components included in the Miller gun.

The nozzle assembly NA actually disclosed is suitable for arc spot welding and includes as an integral structure a nozzle 511 and an extension cylinder 515 which may be regarded as part of the barrel from which the nozzle 511 extends. The extension 511 corresponds to and replaces the extension E of the Miller gun (FIG. 2 Miller).

The nozzle 511 and extension 515 have a common generally circularly cylindrical external surface. The nozzle 511 has an internal surface which tapers from the extension 515 to the tip 517 of the nozzle. The tip 517 is annular and is adapted to be placed in engagement with the work being welded. The tip is so formed for the purpose of producing a butt weld between flat pieces. Nozzle tips for welds of other types are disclosed in Morley Patent 2,845,524. The tip 517 of the nozzle has notches 519 through which the shielding gas and any gas produced during the welding may flow.

The extension 515 has a generally cylindrical internal surface. Within the extension there is a cooling cavity 521 which is in communication with the base of the extension through tubular openings 21 and 23. Cooling water is supplied to the cavity 521 through opening 21 and flows away from the cavity through openings 23. The extension is provided with a shoulder 523 by means of which it is secured to the housing H.

The spacer SI is composed of insulating material such as nylon and is similar to the spacer SI of the Miller patent. This spacer has a pair of openings 61 and 63 circumferentially disposed so that they are coextensive with the openings 21 and 23 respectively. In one of its faces generally perpendicular to the axis of the barrel B, the spacer SI has a groove 71 which communicates with the center 73 of the spacer.

The spacer SI could be bolted to the extension 515 as disclosed in Miller patent. But in the gun disclosed in FIGS. 1, 2 and 3 the spacer is secured to the extension 515 by a bezel ring and engages the shoulder 523 to compress the extension 515 against one base of the spacer SI. A gasket 79 is interposed between the spacer SI and the extension 515. The spacer and the extension 515 are so oriented that the openings 61 and 21 and 63 and 23 are coextensive. The gasket 79 has openings at the junctions between the openings 61 and 21 and 63 and 23.

The header DE is of generally cylindrical form with a flanged stem 81 extending centrally from one of its bases 83. The cylindrical wall of the header DE has on one side a transverse opening or groove 85 extending circumferentially over an angle of about 180°. This opening 85 communicates with the opening 87 in the center of the header and opening 87 is coextensive with the opening 89 in the stem 81. The flange 91 of the stem 81 which is remote from the base 83 has a plurality of longitudinal openings 93.

The header DE has openings 97, 99 and 101 through which the water inlet conductor WI, the water outlet conductor WO, and the gas inlet conductor GI pass. The header DE is secured to the spacer SI by bolts (not shown) in the manner disclosed in Miller patent with a gasket 111 interposed between the base 83 of the header and the spacer. The header DE is so oriented that the tube WI is in communication with the openings 61 and 21, the outlet tube WO with 63 and 23 and the gas inlet tube GI with the groove 71. The groove 71 is in communication through the center of the stem 81 with the openings 93 and thus gas flows through the openings 93.

For securing the guide tube GE the header DE includes the clamping jaw 113, the jaw housing 115 and set screw 117. The electrode guide tube is clamped between the jaw 113 and the housing 115 by pressure exerted by the screw 117 which screws into the housing 115.

The centering tube CT is composed of an insulating material such as melamine. The external surface of the tube CT is longitudinally fluted, the flutes or grooves 551 being joined by circularly cylindrical sections 553. The sections 553 are dimensioned so that the tube CT may be slipped into the portion of the barrel including the extension 521 and the insulating spacer SI and held by this portion. The internal surface of the tube CT is circular and dimensioned to encase the guide tube GE. Preferably, the tube CT is positioned in the barrel so that its rim nearest the nozzle 511 extends just to or just beyond the boundary of the cavity 521 nearest the nozzle. The relative dimensions of the tube CT and the guide tube GE are such that the tube CT centers the tube GE at the tip 517 of the nozzle 511, but when the screw 117 is released, the tube GE may be readily removed by a tool inserted in the nozzle 511.

In the use of the apparatus the guide tube GE is secured by the set screw 117. The electrode Z is advanced through the tube GE and passes out of the tube GE near the center of the rim of the nozzle 511 just above the rim. The arc is maintained substantially at the center of the rim 117 and the weld is centered. The shielding gas passes through the openings 93 and along the flutes 551 to the nozzle where it enshrouds the arc. Since the arc is at the center of the nozzle the gas produces a highly effective shield.

While a preferred embodiment of this invention has been disclosed herein, many modifications thereof are feasible. For example, instead of guiding the electrode to the center of the rim of the nozzle, the guide tube GE may be set by a tube CT having an eccentric opening so that it guides the electrode Z to a predetermined off-center position. The flutes 551 could under certain circumstances be replaced by grooves of other types; for example, helical grooves. This invention then is not to be restricted except insofar as is necessitated by the spirit of the prior art.

I claim as my invention:

1. An arc welding gun for welding with a consumable electrode having a barrel terminating in a gas nozzle, said nozzle having a gas transmitting opening terminating at its tip, said nozzle including a cavity terminating a predetermined distance from said tip and said barrel including fluid channels for transmitting cooling fluid to and away from said cavity, said gun including an electrode guide tube extending through said barrel and nozzle to a position near said tip for transmitting said electrode to said tip, and a centering tube in engagement with the internal surface of at least a portion of said barrel and restrictively encasing said electrode guide tube to center said electrode guide tube, said centering tube having indentations along the external surface thereof providing spaces between said external surface and said internal surface, said barrel including gas supply means in communication with said spaces for transmitting gas through said spaces to said tip of said nozzle, said centering tube extending at least to the terminal of said cavity nearest said tip.

2. An arc welding gun for welding with a consumable electrode having a barrel terminating in a gas nozzle, said nozzle having a gas transmitting opening terminating at its tip, said nozzle including a cavity terminating a predetermined distance from said tip and said barrel including fluid channels for transmitting cooling fluid to and away from said cavity, said gun including an electrode guide tube extending through said barrel and nozzle to a position near said tip for transmitting said electrode to said tip, and a centering tube of insulating material in engagement with the internal surface of at least a portion of said barrel and restrictively encasing said electrode guide tube to center said electrode guide tube, said centering tube having indentations along the external surface thereof providing spaces between said external surface and said internal surface, said barrel including gas supply means in communication with said spaces for transmitting gas through said spaces to said tip of said nozzle, said centering tube extending at least to the terminal of said cavity nearest said tip.

3. An arc welding gun particularly for spot welding with a consumable electrode having a barrel terminating in a gas nozzle, said nozzle having a gas transmitting opening terminating at its tip, said gun including an electrode guide tube extending through said barrel and nozzle to a position near said tip for transmitting said electrode to said tip, and a centering tube in engagement with the internal surface of at least a portion of said barrel and restrictively encasing said electrode guide tube to center said electrode guide tube, said centering tube having indentations along the external surface thereof providing spaces between said external surface and said internal surface, said barrel including gas supply means in communication with said spaces for transmitting gas through said spaces to said tip of said nozzle.

4. An arc welding gun for welding with a consumable electrode having a barrel terminating in a gas nozzle, said nozzle having a gas transmitting opening terminating at its tip, said nozzle including a cavity terminating a predetermined distance from said tip and said barrel including fluid channels for transmitting cooling fluid to and away from said cavity, said gun including an electrode guide tube extending through said barrel and nozzle to a position near said tip for transmitting said electrode to said tip, and a centering tube in engagement with the internal surface of at least a portion of said barrel and restrictively encasing said electrode guide tube to center said electrode guide tube, said centering tube having indentations along the external surface thereof providing spaces between said external surface and said internal surface, said barrel including gas supply means in communication with said spaces for transmitting gas through said spaces to said tip of said nozzle.

5. An arc welding gun particularly for arc spot welding work with a consumable electrode, said gun having a barrel terminating in a gas nozzle, said nozzle having a gas transmitting opening terminating in a tip adapted to engage said work in arc spot welding relationship with said gas shielding the welding arc, said gun including gas transmitting channel means, said gun also including an electrode guide tube extending through said barrel for transmitting a welding electrode to said work through said nozzle, said gun also including an additional tube of insulating material, said additional tube extending at least through a portion of said barrel and being held by engagement with the internal surface of said portion, said additional tube restrictively encasing said electrode guide tube, the external surface of said additional tube being grooved to form spaces between said internal and said external surfaces providing communication channels between said gas transmitting channel means and said nozzle.

6. An arc welding gun particularly for arc spot welding work with a consumable electrode, said gun having a barrel terminating in a gas nozzle, said nozzle having a gas transmitting opening terminating in a tip adapted to engage said work in arc spot welding relationship with said gas shielding the welding arc, said gun including gas transmitting channel means, said gun also including an electrode guide tube extending through said barrel for transmitting a welding electrode to said work through said nozzle, said gun also including an additional tube of insulating material, said additional tube extending at least through a portion of said barrel and being held by engagement with the internal surface of said portion substantially coaxially with said nozzle, said additional tube restrictively encasing said electrode guide tube, the external surface of said additional tube being grooved to form spaces between said internal and said external surfaces providing communication channels between said gas transmitting channel means and said nozzle.

7. An arc welding gun particularly for spot welding with a consumable electrode having a barrel terminating in a gas nozzle, said nozzle having a gas transmitting opening terminating at its tip, said gun including an electrode guide tube extending through said barrel and nozzle to a position near said tip for transmitting said electrode to said tip, and a centering tube in engagement with the internal surface of at least a portion of said barrel and restrictively encasing said electrode guide tube to center said electrode guide tube, said centering tube having indentations extending generally longitudinally along the external surface thereof providing longitudinal spaces between said external surface and said internal surface, said barrel including gas supply means in communication with said spaces for transmitting gas through said spaces to said tip of said nozzle.

References Cited in the file of this patent

UNITED STATES PATENTS

| | | |
|---|---|---|
| 2,768,280 | Renaudie | Oct. 23, 1956 |
| 2,813,193 | Bichsel | Nov. 12, 1957 |
| 2,876,334 | Wojciak et al. | Mar. 3, 1959 |
| 2,881,305 | Wojciak et al. | Apr. 7, 1959 |